Figure 1B:
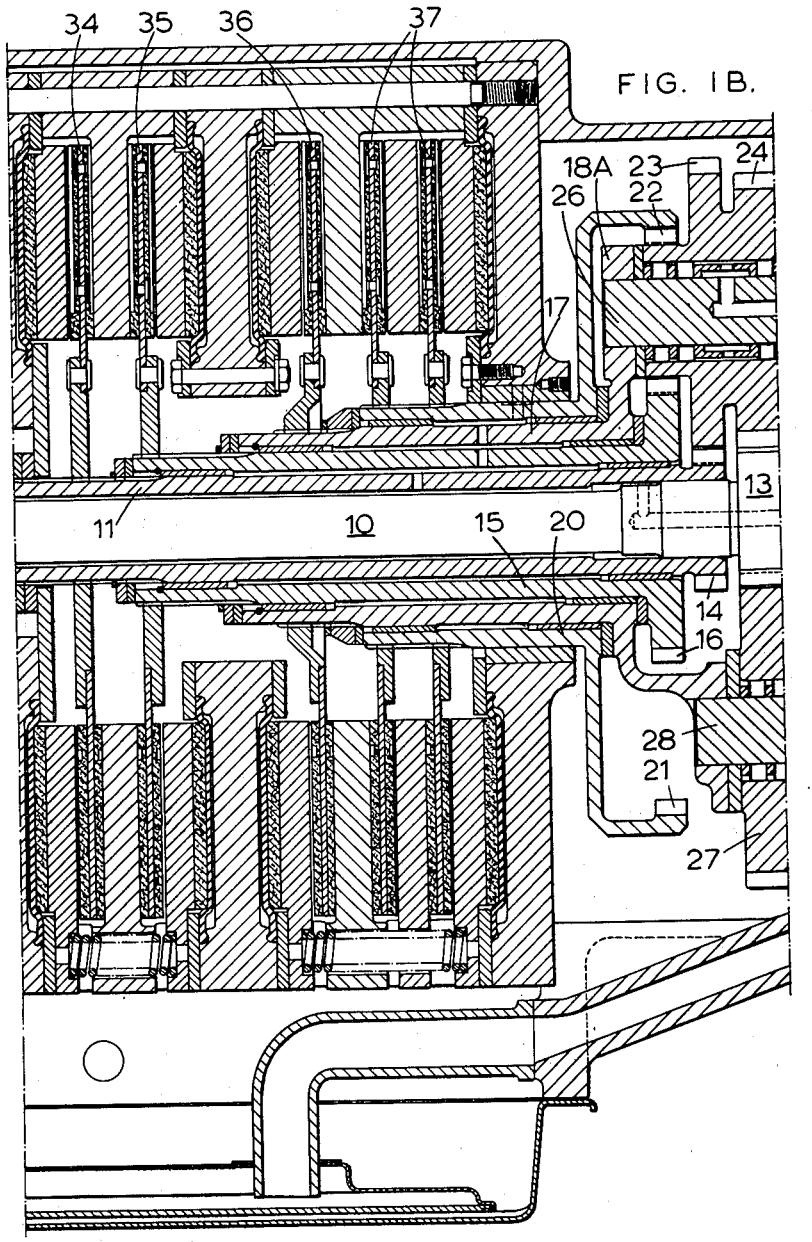

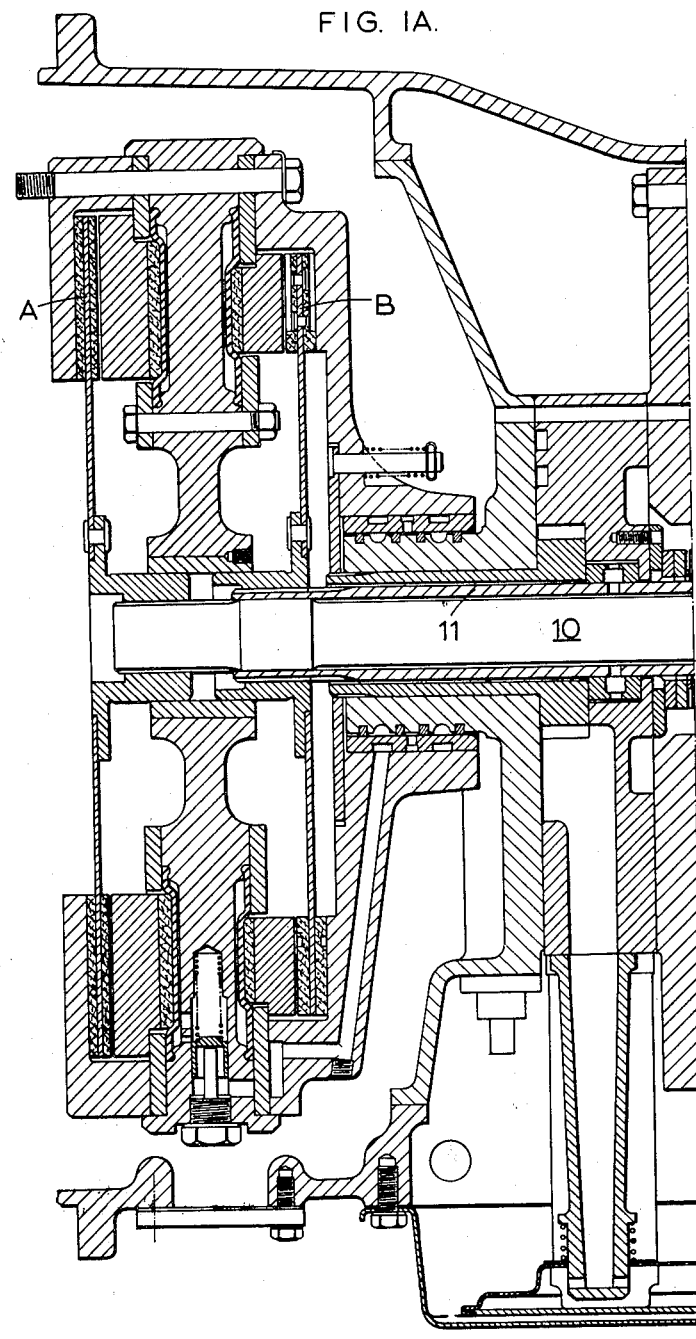

March 17, 1964  H. F. HOBBS  3,124,974
POWER TRANSMISSION APPARATUS
Filed Jan. 18, 1962  4 Sheets-Sheet 3
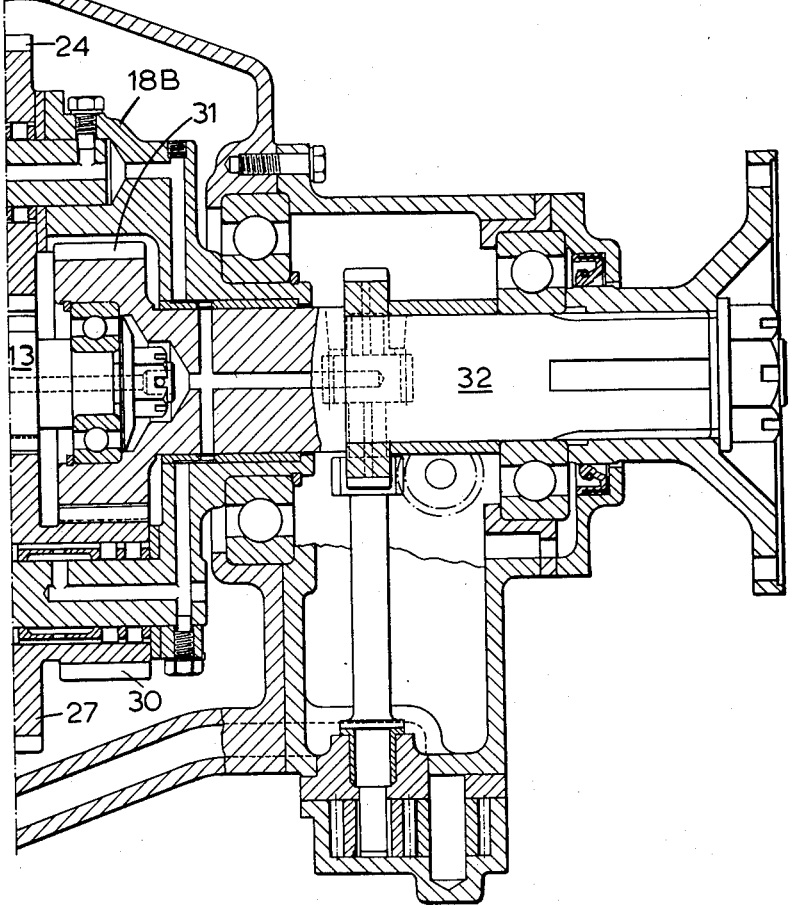
FIG. IC.
INVENTOR
HOWARD FREDERICK HOBBS
By Irwin S. Thompson
ATTY.

March 17, 1964     H. F. HOBBS     3,124,974
POWER TRANSMISSION APPARATUS

Filed Jan. 18, 1962     4 Sheets-Sheet 4

INVENTOR
HOWARD FREDERICK HOBBS
BY Irwin S. Thompson
ATTY.

United States Patent Office 3,124,974
Patented Mar. 17, 1964

3,124,974
POWER TRANSMISSION APPARATUS
Howard Frederick Hobbs, Leamington Spa, England, assignor to Hobbs Transmission Limited, Leamington Spa, England
Filed Jan. 18, 1962, Ser. No. 166,992
Claims priority, application Great Britain Jan. 24, 1961
4 Claims. (Cl. 74—759)

This invention relates to power transmission gearing of the kind having an epicyclic gear train, a plurality of input clutches, and a plurality of brakes for holding appropriate parts of the gear train stationary to achieve different required ratios. Such gearing can be designed for four forward ratios and one reverse ratio without undue complication, but it is difficult to obtain five forward ratios and a reverse ratio as this additional ratio tends to introduce considerable complication and size of parts. It is also difficult to obtain a sufficiently wide range of ratios.

The main object of the invention is to obtain this additional ratio with minimum additional parts and size, and adequate range of ratios. Further objects are to maintain progressive change in momentum of parts as the ratios are progressively changed and to avoid unduly high tooth speeds of the gears. The invention also aims to achieve these objects with the use of (1) only a single cage in the epicyclic train, (2) the same gear reaction element for both first gear and reverse gear and (3) only one operative change of clutch or brake to bring about each change in ratio.

According to the invention the power transmission comprises two input clutches one of which is engaged for all forward ratios while the other is also engaged for direct drive, an epicyclic gearing driven by said clutches and in turn driving an output shaft, said epicyclic gear including a three pinion cluster carried by a rotary cage which is concentric with the input clutches, and four reaction brakes for holding parts of said gear stationary, said gear including two sunwheels meshing with two of said pinions of the cluster, and a third sunwheel which is in permanent driving engagement with all said reaction brakes whereby five forward ratios are obtained in which the cage has progressive speed changes in said ratios respectively.

According to a preferred form of the invention the power transmission comprises two input clutches, the first clutch connecting with a shaft, the second clutch connecting with a first sleeve surrounding said shaft, a second sleeve surrounding the first sleeve, a third sleeve surrounding the second sleeve, a fourth sleeve surrounding the third sleeve; four reaction brakes connected respectively with the said sleeves; a cage coaxial with said shaft and carrying a three-pinion cluster of different size pinions, first, second and third sunwheels of different sizes carried respectively by the shaft and first and second sleeves respectively; two pinions of said three pinion cluster meshing with said second and third sunwheels; said cage being drivably connected with the first sunwheel and with the output shaft; and a ring gear carried by one of the sleeves and meshing with one of the pinions of the three pinion cluster, whereby the first sunwheel is in permanent driving connection with all of the reaction brakes and five forward ratios are obtained in which the cage has progressive speed changes in said ratios respectively.

Figure 2:
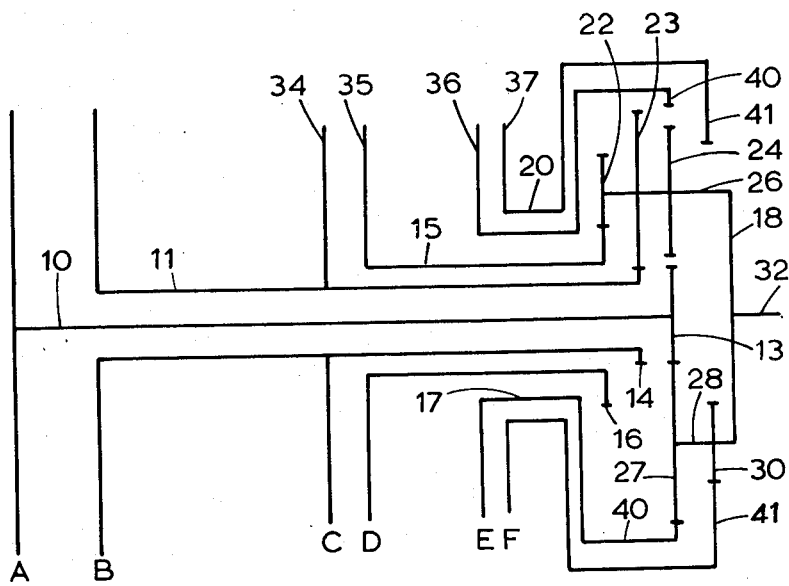

Constructional forms of the invention will now be described by way of example with reference to the accompanying diagrammatic drawings wherein:

FIGURES 1A, 1B and 1C together constitute a sectional view on a central vertical plane of a power transmission mechanism made in accordance with the invention; and FIGURE 2 is a diagrammatic view of a modified construction.

Referring first to FIGURE 1, two input shafts 10, 11 are provided, the second being a sleeve concentrically surrounding the first. These are connected respectively with separate controllable input friction clutches A, B whereby shaft 10 is driven in all forward ratios, both shafts are driven in top gear for direct drive, and shaft 11 alone is driven for reverse ratio. These shafts carry first and second sunwheels 13, 14 respectively.

A second sleeve 15 surrounds the first sleeve 11 and carries a third sunwheel 16. A third sleeve 17 on sleeve 15 carries a cage consisting of a front part 18A and a rear part 18B. A fourth sleeve 20 surrounds third sleeve 17 and carries a ring gear 21.

A three-pinion cluster has a small pinion 22, a large pinion 23, and an intermediate size pinion 24. This cluster is carried by pivot 26 offset from 10, 11 and carried by the cage 18A, 18B. Pinion 22 meshes with both the ring gear 21 and the sunwheel 16. Pinion 23 meshes with sunwheel 14. Pinion 24 meshes with an output pinion 27 carried by a layshaft 28, which latter is carried by the cage 18A, 18B. The output pinion 27 also meshes with the first sunwheel 13. Pinion 27 is integral with another pinion 30 that drives a gearwheel 31 on an output shaft 32.

Four reaction brakes 34, 35, 36, 37 are provided connected respectively with sleeve 11 and sunwheel 14; sleeve 15 and sunwheel 16; sleeve 17 and cage 18; and sleeve 20 and ring gear 21.

By the simple addition of the ring gear 21 and its brake all the objects of the invention are achieved.

The ratios are obtained as follows:

1st clutch A engaged. Brake 37 engaged.
2nd clutch A engaged. Brake 36 engaged.
3rd clutch A engaged. Brake 35 engaged.
4th clutch A engaged. Brake 34 engaged.
5th (direct drive) clutches A and B engaged.
Reverse: Clutch B engaged. Brake 37 engaged.

If required a second reverse can be obtained by engagement of clutch B and brake 36.

The following is an example of the ratios obtainable:

1st 8.32
2nd 4.39
3rd 2.59
4th 1.58
5th 1.00
Reverse 11.70

All the four reaction brakes are drivably connected with the same sunwheel, i.e. with the first sunwheel 13. This will be apparent if one considers that if the output shaft 32 were held fast and the sunwheel 13 is rotated forwards, all the reaction sleeves (if freed) would rotate backwards. This construction provides a simple construction whereby the cage 18A, 18B will have a speed increase progressively through the ratios, viz:

In 1st ratio the cage rotates slowly backwards.
In 2nd ratio the cage is stationary.
In 3rd ratio the cage rotates slowly forwards.
In 4th ratio the cage speed increases.
In 5th ratio the cage speed increases to the input speed.

With slight modifications to the numbers of the teeth the following transmission ratios can be obtained:

1st 8.45
2nd 4.43
3rd 2.57
4th 1.68
5th 1.00
Reverse 9.94

The ratios of this second set of ratios are almost exactly equally spaced. A wide selection of ratios can be obtained by alteration of numbers of teeth.

The input shaft 10 is driven continuously during all the forward ratios and it is directly connected to the output shaft 32 by a train of gears 27, 30, 31. The cage 18A, 18B is driven at progressive speeds against the reaction throughout the range by means of the remainder of the gearing and the brakes.

The pinions in the three-pinion reaction cluster gear with reaction elements and for forward operation none of these elements serves any other purpose.

The pinion cluster 22, 23, 24 may have more than three pinions and each pinion may mesh with a sunwheel and/or a ring gear. Each of these sunwheels or ring gears may be held stationary to provide another ratio.

The first ratio gear brake 37 has been shown with two plates and the remainder with one, but more plates may be used, e.g. three for first ratio gear brake and two for second ratio gear brake. It might sometimes be necessary to use even four for first gear if the ratio is very great.

In FIGURE 2 similar references refer to similar parts. The construction is similar to that of FIGURE 1 but in this case the cage 18 is carried by the output shaft 32, the third and fourth sleeves carry ring gears 40, 41 respectively which mesh with pinion 27 and with pinion 30 of the two pinion member 27, 30. In this case also the cage (and thus also the spindles carrying the cluster of pinions) changes its speed of rotation around the axis of the gear in a progressive manner. Drive in all forward ratios will still be derived from shaft 10 and clutch A and all ratio changes will still be produced by a single change of clutch or brake for each ratio. The same reaction element is still used for first and reverse ratios.

It will be observed that in this alternative construction, first gear ratio can be very great because of the compound reaction through gears 13, 27, 30, 21.

In this case, all the pinions 22, 23, 24, 27, 30 are used only for reaction purposes when driving in forward gear.

The relative speed of the spindles in relation to the input shaft is greatest when the ratio is at maximum and zero when the ratio is 1:1. Similarly, the speeds of the meshing teeth are a maximum when ratio is a maximum and zero when the ratio is 1:1.

I claim:

1. A power transmission mechanism comprising two input clutches one of which is engaged for all forward ratios while the other is also engaged for direct drive, an output shaft, an epicyclic gearing driven by said clutches and in turn driving the output shaft, said epicyclic gear including a rotary cage, a three pinion cluster carried by the rotary cage and a two pinion cluster carried by the rotary cage, and four reaction brakes for holding parts of said gear stationary, said gear including first and second sunwheels, the first pinion of the two pinion cluster meshing with the first sunwheel and with the first pinion of the three pinion cluster, the second pinion of the two pinion cluster being drivably connected with the output shaft, the second sunwheel meshing with the second pinion of said three pinion cluster, and a third sunwheel which is in mesh with the third pinion of said cluster, said gear also including a ring gear connected with one of said brakes and meshing with one of the pinions of one of the clusters, whereby five forward ratios are obtained in which the cage has progressive speed changes in said ratios respectively.

2. A power transmission mechanism comprising two input clutches, said clutches having a common input part for connection to an engine and separate output parts, the output part of the first of said clutches being engaged with the input part for all forward ratios while the output part of the second clutch is also engaged with the input part for direct drive, an output shaft, an epicyclic gearing driven by said output parts of said clutches and in turn driving the output shaft, said epicyclic gear including a rotary cage concentric with the clutches, a three pinion cluster carried by the rotary cage on an axis eccentric with respect to the axis of the cage, and a two pinion cluster carried by the rotary cage on another axis eccentric with respect to the axis of the cage; and four reaction brakes for holding different parts of said gear stationary, said brakes each including a rotary part which can be held stationary or released so that it can rotate, said gear including first and second sunwheels, connected with the output parts of the first and second clutches, respectively, the first sunwheel being in mesh with the first pinion of the two pinion cluster, said first pinion of the two pinion cluster being in mesh with the third pinion of the three pinion cluster, the second sunwheel being in mesh with the second pinion of the three pinion cluster and being connected to the rotary part of the first brake, and a third sunwheel connected to the rotary part of the second brake and in mesh with the first pinion of the three pinion cluster, said epicyclic gear including a ring gear connected with the rotary part of the fourth brake and in mesh with a pinion of one of the clusters, whereby five forward ratios are obtained in which the cage has progressive speed changes in said ratios respectively.

3. A power transmission mechanism comprising two input clutches, said clutches having a common input part for connection to an engine and separate output parts, the output part of the first of said clutches being engaged with the input part for all forward ratios while the output part of the second clutch is also engaged with the input part for direct drive, an output shaft, an epicyclic gearing driven by said output parts of said clutches and in turn driving the output shaft, said epicyclic gear including a rotary cage concentric with the clutches, a three pinion cluster carried by the rotary cage on an axis eccentric with respect to the axis of the cage, and a two pinion cluster carried by the rotary cage on another axis eccentric with respect to the axis of the cage; and four reaction brakes for holding different parts of said gear stationary, said brakes each including a rotary part which can be held stationary or released so that it can rotate, said gear including first and second sunwheels, connected with the output parts of the first and second clutches, respectively, the first sunwheel being in mesh with the first pinion of the two pinion cluster, said first pinion of the two pinion cluster being in mesh with the third pinion of the three pinion cluster, the second sunwheel being in mesh with the second pinion of the three pinion cluster and being connected to the rotary part of the first brake, and a third sunwheel connected to the rotary part of the second brake and in mesh with the first pinion of the three pinion cluster, said cage being connected to the rotary part of the third brake, said epicyclic gear including a ring gear connected with the rotary part of the fourth brake and in mesh with the first pinion of the three pinion cluster, and a gear wheel fixed on the output shaft and in mesh with the second pinion of the two pinion cluster, whereby five forward ratios are obtained in which the cage has progressive speed changes in said ratios respectively.

4. A power transmission mechanism comprising two input clutches, said clutches having a common input part for connection to an engine and separate output parts, the output part of the first of said clutches being engaged with the input part for all forward ratios while the output part of the second clutch is also engaged with the input part for direct drive, an output shaft, an epicyclic gearing driven by said output parts of said clutches and in turn driving the output shaft, said epicyclic gear including a rotary cage concentric with the clutches and carried by output shaft a three pinion cluster carried by the rotary cage on an axis eccentric with respect to the axis of the cage, and a two pinion cluster carried by the rotary cage on another axis eccentric with respect to the axis of the cage; and four reaction brakes for holding different parts of said gear stationary, said brakes each including a rotary part which can be held stationary or released so that it can rotate, said gear including first and second sunwheels, connected with the output parts of the first and second clutches, respectively, the first sunwheel being in mesh with the first pinion of the two pinion cluster, said first pinion of the two pinion cluster being in mesh with the third pinion of the three pinion cluster, the second sunwheel being in mesh with the second pinion of the three pinion cluster and being connected to the rotary part of the first brake, and a third sunwheel connected to the rotary part of the second brake and in mesh with the first pinion of the three pinion cluster, said epicyclic gear including a first and a second ring gear, said first ring gear being connected with the rotary part of the third brake and in mesh with the first pinion of the two pinion cluster, said second ring gear being connected with the rotary part of the fourth brake and in mesh with the second pinion of two pinion cluster, whereby five forward ratios are obtained in which the cage has progressive speed changes in said ratios respectively.

References Cited in the file of this patent

UNITED STATES PATENTS

| | | |
|---|---|---|
| 1,231,529 | Pollard | June 26, 1917 |
| 2,355,427 | Duffield | Aug. 8, 1944 |
| 3,077,795 | Chambers et al. | Feb. 19, 1963 |

FOREIGN PATENTS

| | | |
|---|---|---|
| 738,590 | Great Britain | Oct. 19, 1955 |
| 879,430 | Great Britain | Oct. 11, 1961 |